(12) United States Patent
Sato et al.

(10) Patent No.: US 8,486,307 B2
(45) Date of Patent: Jul. 16, 2013

(54) SILVER MICROPOWDER HAVING EXCELLENT AFFINITY FOR POLAR MEDIUM, AND SILVER INK

(75) Inventors: Kimitaka Sato, Okayama (JP); Shinya Sasaki, Okayama (JP); Taro Nakanoya, Okayama (JP)

(73) Assignee: Dowa Electroncis Materials Co., Ltd., Tokyo (JP)

( * ) Notice: Subject to any disclaimer, the term of this patent is extended or adjusted under 35 U.S.C. 154(b) by 382 days.

(21) Appl. No.: 12/811,598

(22) PCT Filed: Dec. 25, 2008

(86) PCT No.: PCT/JP2008/073624
§ 371 (c)(1),
(2), (4) Date: Jul. 2, 2010

(87) PCT Pub. No.: WO2009/087919
PCT Pub. Date: Jul. 16, 2009

(65) Prior Publication Data
US 2010/0288159 A1      Nov. 18, 2010

(30) Foreign Application Priority Data

Jan. 6, 2008  (JP) .................................. 2008-000221
Dec. 22, 2008  (JP) .................................. 2008-325182

(51) Int. Cl.
*H01B 1/22* (2006.01)
*H01B 1/02* (2006.01)

(52) U.S. Cl.
USPC .......................... 252/514; 106/31.13; 428/403

(58) Field of Classification Search
USPC .......................... 252/514; 106/31.13; 428/403
See application file for complete search history.

(56) References Cited

U.S. PATENT DOCUMENTS

| 2006/0150776 | A1* | 7/2006 | Nakamoto et al. | 75/710 |
| 2007/0151600 | A1* | 7/2007 | Li et al. | 136/263 |
| 2008/0020317 | A1* | 1/2008 | Park et al. | 430/138 |
| 2010/0165546 | A1* | 7/2010 | Yoshida et al. | 361/525 |

FOREIGN PATENT DOCUMENTS

| JP | 2004-054085 | 2/2004 |
| JP | 2006-089786 | 4/2006 |
| JP | 2006-169592 | 6/2006 |
| JP | 2006161145 A * | 6/2006 |
| JP | 2006-196278 | 7/2006 |
| JP | 2006-219693 | 8/2006 |
| JP | 2007-039718 | 2/2007 |
| JP | 2007-046072 | 2/2007 |
| WO | 2004/012884 | 2/2004 |

OTHER PUBLICATIONS

Huang et al., "Nano-silver: Preparation by gallic acid reduction and reaction mechanism", Wuji Huaxue Xuebao (2007), 23(10), 1683-1688.*
Alvarez-Ros, M.C., et al., "Adsorption and chemical modification of gallic acid on silver nanoparticles studied by Raman spectroscopy: Effect of anions and cationic pesticide paraquat", Canadian Journal of Analytical Sciences and Spectroscopy (2003), 48(2), 132-138.*
Yujie Xiong et al., "Ultrasound-Assisted Self-Regulation Route to Ag Nanorods", Chemistry Letters (2002), 98-99.*
Huang et al., "Nano-silver: Preparation by gallic acid reduction and reaction mechanism", Wuji Huaxue Xuebao (2007), 23(10), 1683-1688 (Original and English translation).*
Masami Nakamoto et al., "Application of Silver Nanoparticles to Conductive Pastes", Chemical Industry, by Kagaku Kogyo-Sha, Oct. 2005, pp. 749-754.

* cited by examiner

*Primary Examiner* — Douglas McGinty
(74) *Attorney, Agent, or Firm* — Clark & Brody

(57) ABSTRACT

Provided are silver nanoparticles having a good affinity (that is, dispersibility) for y-butyrolactone ($C_4H_6O_2$), an organic solvent which has a relatively high boiling point though having a relatively small molecular weight, and has a low viscosity and a low surface tension and which has little irritating odor. The above problems are solved by providing a silver micropowder excellent in affinity for at least y-butyrolactone, which comprises silver particles processed to adsorb at least one of 1,4-dihydroxy-2-naphthoic acid ($C_{11}H_8O_4$) and gallic acid ($C_7H_6O_5$) on the surfaces thereof and having an X-ray crystal particle diameter $D_X$ of from 1 to 40 nm, preferably from 1 to 15 nm. The invention also provides a silver ink obtained by dispersing silver particles processed to adsorb an organic compound having a carboxyl group on the surfaces thereof and having an X-ray crystal particle diameter $D_X$ of from 1 to 40 nm, preferably from 1 to 15 nm (or having a mean particle diameter $D_{TEM}$, as measured through TEM microscopy, of from 3 to 40 nm, preferably from 4 to 15 nm), in y-butyrolactone.

3 Claims, 2 Drawing Sheets

SILVER MICROPOWDER HAVING EXCELLENT AFFINITY FOR POLAR MEDIUM, AND SILVER INK

TECHNICAL FIELD

The present invention relates to a silver micropowder excellent in affinity for polar medium, especially for γ-butyrolactone, which comprises silver nanoparticles coated with an organic substance, and to a silver ink. In this description, "nanoparticle" is meant to indicate a particle having a particle diameter of not more than 40 nm or so; and "micropowder" is meant to indicate a powder composed of nanoparticles.

BACKGROUND ART

Silver nanoparticles have high activity and can be sintered even at low temperatures, and have therefore been specifically noted as a patterning material for poorly heat-resistant materials for quite some time. In particular, with the recent advancement in nanotechnologies, production of single-nano class particles has become possible relatively in a simplified manner.

Patent Reference 1 discloses a method of mass-producing silver nanoparticles, starting from silver oxide and using an amine compound. Patent Reference 2 discloses a method of producing silver nanoparticles, comprising mixing an amine and a starting material of silver compound, and melting them. Non-Patent Reference 1 describes production of a paste using silver nanoparticles. Patent Reference 4 discloses a technique of producing silver nanoparticles having extremely good dispersibility in liquid. On the other hand, Patent Reference 3 discloses a method of changing a protective material for metal nanoparticles, from A to B, which comprises adding a polar solvent where an organic protective material B having a functional group with a high affinity for metal particles, such as a mercapto group or the like is dissolved therein, to a non-polar solvent where metal nanoparticles protected with an organic protective material A exist, then stirring and mixing them.

Patent Reference 1: JP-A 2006-219693
Patent Reference 2: WO04/012884
Patent Reference 3: JP-A 2006-89786
Patent Reference 4: JP-A 2007-39718
Non-Patent Reference 1: Masami Nakamoto, et al., "Application of Silver Nanoparticles to Conductive Pastes", Chemical Industry, by Kagaku Kogyo-Sha, October 2005, pp. 749-754

DISCLOSURE OF THE INVENTION

Problems that the Invention is to Solve

In general, the surfaces of silver nanoparticles are coated with an organic protective material. The protective material plays a role of isolating silver particles from each other in the reaction of producing the particles. Accordingly, it is advantageous to select one having a large molecular weight to some extent. When the molecular weight is small, the distance between the particles may be narrow, and in some case of wet-type synthetic reaction, sintering may go on during the reaction. If so, the particles may grow coarsely and production of a micropowder would be difficult.

On the other hand, when silver nanoparticles are utilized as an ink (in this description, the term "ink" is not limited to a liquid one alone but includes a pasty one produced by dispersing and incorporating silver particles in an organic medium having a high viscosity in some degree), a suitable organic medium is preferably selected depending on the intended use. For example, γ-butyrolactone ($C_4H_6O_2$) may be mentioned as an organic solvent which has a relatively high boiling point though having a relatively small molecular weight, which has a low viscosity and a low surface tension and which has little irritating odor.

However, a silver micropowder having a good affinity for γ-butyrolactone is heretofore unknown. The type of the dispersion medium applicable to a silver micropowder is significantly limited by the type of the protective material (surfactant) that covers the surfaces of the particles of the powder. Heretofore, due to the production constraint, the latitude in selecting the type of the protective material is extremely narrow, and the situation is that a suitable protective material is extremely difficult to select in accordance with the intended application.

In consideration of the current situation as above, the present invention is to provide silver nanoparticles having a good affinity (that is, dispersibility) for γ-butyrolactone.

Means for Solving the Problems

In order to attain the above object, the invention provides a silver micropowder excellent in affinity for at least γ-butyrolactone, which comprises silver particles processed to adsorb at least one of 1,4-dihydroxy-2-naphthoic acid ($C_{11}H_8O_4$) and gallic acid ($C_7H_6O_5$) on the surfaces thereof and having an X-ray crystal particle diameter $D_X$ of from 1 to 40 nm, preferably from 1 to 15 nm.

1,4-Dihydroxy-2-naphthoic acid and gallic acid ($C_7H_8O_5$) both have a carboxyl group (hydrophilic group), and are considered to be adsorbed by the surfaces of Ag particles at the moiety of the carboxyl group thereof.

The invention also provides a silver ink obtained by dispersing silver particles processed to adsorb an organic compound having a carboxyl group on the surfaces thereof and having an X-ray crystal particle diameter $D_x$ of from 1 to 40 nm, preferably from 1 to 15 nm (or having a mean particle diameter $D_{TEM}$, as measured through TEM microscopy, of from 3 to 40 nm, preferably from 4 to 15 nm), in γ-butyrolactone. Examples of the organic compound include the above-mentioned 1, 4-dihydroxy-2-naphthoic acid and gallic acid; and one or more of these may be used here either singly or as combined.

ADVANTAGE OF THE INVENTION

The present invention has made it possible to provide silver nanoparticles having excellent dispersibility in γ-butyrolactone ($C_4H_6O_2$), an organic solvent which has a relatively high boiling point though having a relatively small molecular weight, and has a low viscosity and a low surface tension and which has little irritating odor. The silver micropowder composed of the silver nanoparticles is expected to have various applications.

BEST MODE FOR CARRYING OUT THE INVENTION

Figure 1:
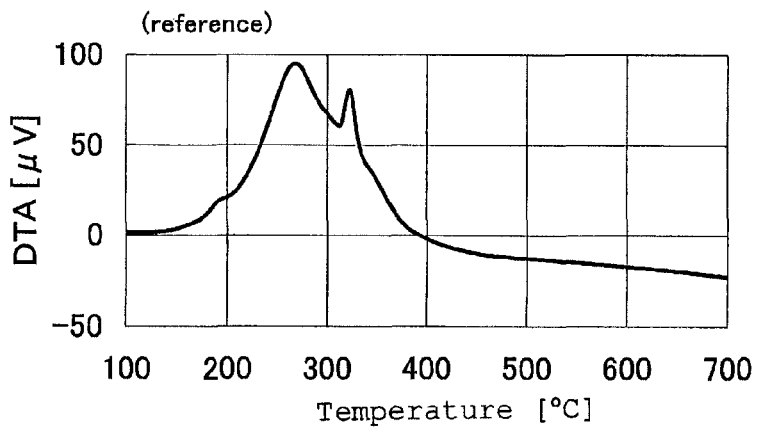
[FIG. 1] This is a DTA curve of oleylamine-coated silver particles before protective material substitution.

Heretofore, in production of silver nanoparticles, the type of the protective material (surfactant) could not be freely selected due to the production constraint. However, according to the method described below, the latitude in selecting the type of the protective material can be broadened to a considerable extent, and therefore, it has become possible to obtain various, heretofore non-existent silver nanoparticles. With that, a novel silver ink has been realized, which comprises, as dispersed in γ-butyrolactone, silver particles processed to adsorb a carboxyl group-having organic compound on the surfaces thereof and having an X-ray crystal particle diameter $D_X$ of from 1 to 40 nm, preferably from 1 to 15 nm (or having a mean particle diameter $D_{TEM}$, as measured through TEM microscopy, of from 3 to 40 nm, preferably from 4 to 15 nm).

It has become clarified that 1,4-dihydroxy-2-naphthoic acid and gallic acid are exemplified as the protective material substance (surfactant) to remarkably improve the dispersibility of silver nanoparticles in γ-butyrolactone. These organic compounds have a carboxyl group, and have the property of being readily adsorbed by the surfaces of silver particles.

The silver nanoparticles of the type can be obtained, for example, according to a process comprising "silver particles production step" and "protective material substitution step". One typical method of the process is exemplified below.

<<Silver Particles Production Step>>

According to the wet process illustrated in Patent Reference 4, silver nanoparticles having a uniform particle size can be produced. The production method comprises reducing a silver compound in an alcohol or a polyol using an alcohol or a polyol as the reducing agent to thereby precipitate silver particles. However, according to the present inventors' later studies, the inventors found a production method more suitable to mass-production, and the present applicant disclosed it in Japanese Patent Application No. 2007-264598. This comprises dissolving a silver compound in a mixed liquid of a primary amine and 2-octanol, and keeping it at 120 to 180° C. to thereby precipitate silver particles by utilizing the reducing power of 2-octanol. In this, the new production method is exemplified in brief.

A silver compound (for example, silver nitrate) as a silver ion source, a primary amine A (having an unsaturated bond and having a molecular weight of from 200 to 400, for example, oleylamine) as a protective material for precipitated silver particles, and 2-octanol as a solvent component and also as a reducing agent are prepared.

The primary amine A, 2-octanol and the silver compound, each taken in a predetermined amount, are mixed to produce a solution where the silver compound is dissolved in the mixed solvent of the amine A and 2-octanol. For the liquid composition at the start of the reduction reaction, in general, preferred conditions could be found within the range satisfying the following (i) to (iii):
(i) molar ratio of amine A/silver: from 1 to 10,
(ii) molar ratio of 2-octanol/silver: from 0.5 to 15,
(iii) molar ratio of 2-octanol/amine A: from 0.3 to 2.

Heating the liquid is begun, and the liquid is kept within a temperature range of from 120 to 180° C. At a temperature lower than 120° C., the reduction could hardly go on and a high reduction rate would be difficult to stably attain. However, it is important not to heat so much over the boiling point. The boiling point of 2-octanol is about 178° C., and heating up to about 180° C. would be acceptable. More preferably, the heating is within a range of from 125 to 178° C. This may be carried out under an atmospheric pressure; but preferably, the system is kept under reflux with purging the vapor phase in the reactor with an inert gas such as nitrogen gas or the like. Silver nanoparticles could be precipitated even though the stirring is not made so strongly; however, when the size of the reactor is large, stirring in some degree will be necessary. In a case with 2-octanol, the latitude in the stirring degree may be broad in producing silver particles having a uniform particle size, as compared with cases of using other alcohols (for example, isobutanol). The necessary all amount of 2-octanol may be mixed in the system before the start, or may be mixed during heating or after heating. After the start of the reduction reaction, 2-octanol may be suitably added (additionally put into the system). Preferably, the retention time within the above temperature range is secured to be at least 0.5 hours; however, it is considered that when the liquid composition satisfying the above (i) to (iii) is used, the reaction could finish within about 1 hour, and even though the retention time is prolonged further more, there would be no change in the reduction rate. In general, the retention time of at most 3 hours may be enough. When silver particles are precipitated with the procedure of the reduction reaction, there is obtained a slurry of silver nanoparticles coated with the amine A.

Next, a solid fraction is collected from the slurry through decantation or centrifugation. The collected solid fraction comprises mainly the silver nanoparticles coated with the protective material of the primary amine A.

The solid fraction is contaminated with impurities, and is preferably washed with methanol or isopropanol.

In the manner as above, silver particles coated with the primary amine A can be produced, having an X-ray crystal particle diameter $D_X$ of from 1 to 40 nm, preferably from 1 to 15 nm. As measured through observation with a transmission electronic microscope (TEM), the mean particle diameter $D_{TEM}$ of the particles falls within a range of from 3 to 40 nm, preferably from 4 to 15 nm or so.

<<Protective Material Substitution Step>>

Next taken is an operation of changing the protective material adhering to the silver particles, from the amine A to the intended substance, organic compound B (in this, at least one of 1,4-dihydroxy-2-naphthoic acid and gallic acid). The production method for the silver particles of the invention is characterized by employing this step.

As the organic compound B, used is one having a carboxyl group. A carboxyl group has the property of being readily adsorbed by silver. The above-mentioned amine A is an amine having an unsaturated bond and having a molecular weight of from 200 to 400, and its power to adhere to silver is considered to be smaller than that of a substance having a carboxyl group. Accordingly, when a sufficient amount of molecules of the organic compound B exist around the surfaces of the silver particles coated with the amine A, then the amine A is desorbed from the silver surface to produce a situation where the organic compound B could be readily adsorbed and the substitution may go on relatively easily.

However, since the substitution goes on in a solvent, the organic compound B must be dissolved in a solvent. As the organic compound B, selected is one having a good affinity for a polar solvent, γ-butyrolactone; and therefore, as the solvent to dissolve the organic compound B, employed is a polar solvent. Concretely, of solvents such as isopropanol, methanol, ethanol, decalin and others, those of good solubility may be selected. For the organic compound B well dissolving in isopropanol, isopropanol is advantageously selected from the viewpoint of the safety and the cost in many cases. Silver nanoparticles coated with the amine A are made to exist in the above-mentioned polar solvent C where the organic compound B is dissolved, and stirred at a temperature falling within a range of from 30° C. to the boiling point of the polar solvent C. At a temperature lower than 30° C., the substitution could hardly go on. In case where isopropanol is used as the polar solvent C, the stirring is taken preferably within a range of from 35 to 80° C. The particles coated with the amine A are, in general, poorly dispersible in the polar solvent C and are readily precipitated in the liquid, therefore requiring stirring; however, it is unnecessary to stir them so strongly and a state where the particles could be kept floating in the liquid may be enough.

The substitution reaction of the amine A with the organic compound B having a carboxyl group is considered to occur within a relatively short period of time of a few minutes or so; but from the viewpoint of supplying those of industrially stable quality, the substitution reaction is preferably secure for 1 hour or more. However, even over 24 hours, further substitution reaction could not go on any more, and therefore the substitution reaction may be finished within 24 hours from the practical viewpoint. Preferably, the time to be taken for the substitution is set to fall within a range of from 1 to 7 hours.

Concretely, a liquid is previously prepared by completely dissolving an organic compound B in a polar solvent C, and the liquid is put in one container along with therein the amine A-adhering silver nanoparticles collected as a solid fraction, and these may be stirred and mixed. In case where the organic compound B is liquid at room temperature, "polar solvent C where organic compound B is dissolved" as referred to in this description means that the organic compound B is not separated from the polar solvent C but the two are uniformly mixed with each other. The equivalent amount of the organic compound B relative to the metal Ag in the particles, B/Ag is preferably from 0.1 to 10 equivalents. In this, one carboxyl group of the organic compound B corresponds to one equivalent relative to 1 mol of Ag. The liquid amount of the polar solvent C may be set within a range to secure the amount enough for silver nanoparticles to float in the liquid.

After the silver particles adsorbing the organic compound B on the surfaces thereof are formed in the manner as above, the system is processed for solid-liquid separation, and preferably, for example, an operation of "adding a washing liquid (for example, methanol or isopropanol) to the separated and collected solid fraction, then ultrasonically dispersing it and centrifuging the liquid to collect a solid fraction" is repeated a few times to thereby wash away the adhering impurities. The washed particles are silver nanoparticles having an X-ray crystal particle diameter $D_x$ of from 1 to 40 nm, preferably from 1 to 15 nm, or having a mean particle diameter $D_{TEM}$, as measured through TEM microscopy, of from 3 to 40 nm, preferably from 4 to 15 nm, and they have a surfactant of the organic compound B adsorbed by their surfaces. The washed solid fraction is dispersed in the intended solvent of γ-butyrolactone to give a silver ink.

EXAMPLES

Example 1

According to the method mentioned below, silver particles protected with a primary amine A as a protective material, and then the protective material was changed from the amine A to an organic compound B.

In this Example, oleylamine was used as the primary amine A, and 1,4-dihydroxy-2-naphthoic acid was as the organic compound B, and the method comprises the following steps.
[Silver Particles Production Step]

6009.2 g of oleylamine (special grade chemical by Kanto Chemical), 2270.3 g of 2-octanol (special grade chemical by Wako Pure Chemical Industries), and 1495.6 g of silver nitrate crystal (special grade chemical by Kanto Chemical) were prepared.

2-Octanol, oleylamine and silver nitrate crystal were mixed to prepare a solution in which silver nitrate was completely dissolved. The composition ratio was as follows:
ratio by mol of oleylamine/silver=2.5,
ratio by mol of alcohol/silver=2.0,
ratio by mol of alcohol/oleylamine=2.0/2.5=0.8.

10 L of the liquid of the above composition was prepared, transferred into a container equipped with a reflux condenser, put in an oil bath, and with stirring at 100 rpm with a propeller, this was heated up to 120° C. at a heating speed of 1.0° C./min, and then up to 140° C. at a heating speed of 0.5° C./min. Next, with keeping the above stirring state, this was left at 140° C. for 1 hour. During this, the vapor phase in the container was purged with nitrogen gas at a flow rate of 500 mL/min. Next, the heating was stopped, and this was cooled.

After the reaction, the slurry was kept static for 3 days, and then the supernatant was removed. In this step, the amount of the supernatant to be removed was so controlled that the reduced silver could be 20% by mass to the whole slurry. After the supernatant removal, 1700 g of isopropanol was added to 500 g of the slurry, then kept stirred at 400 rpm with a propeller for 1 hour, and thereafter centrifuged to collect a solid fraction containing silver particles. In the thus-washed solid fraction, silver particles coated with amine A (oleylamine) exist.

Analysis of the unwashed slurry taken separately confirmed the existence of about 1 mol of metal Ag in 500 g of the unwashed slurry.

Apart from the above, the washed solid fraction produced under the same condition as above was sampled in a small amount, and the sample was analyzed in the manner mentioned below to determine the X-ray crystal particle diameter $D_x$. As a result, $D_x$ of the silver micropowder before substitution was confirmed to be about 7 nm. In addition, the mean particle diameter $D_{TEM}$ was determined in the manner mentioned below. As a result, $D_{TEM}$ of the silver micropowder before substitution was confirmed to be about 8 nm. From the washed solid fraction, as produced under the same condition as above, the oleylamine-coated silver micropowder before substitution was collected and analyzed through TG-DTA at a heating speed of 10° C./min. The DTA curve is shown in FIG. 1. In FIG. 1, the large mountain appearing between 200 and 300° C. and the peak appearing between 300 and 330° C. are considered to be derived from the amine A, oleylamine.

<Determination of X-ray Crystal Particle Diameter $D_x$>

The solid fraction sample of silver particles was applied onto a glass cell, set in an X-ray diffractometer, and based on the diffraction peak of the Ag (111) plane, the X-ray crystal particle diameter $D_x$ was computed according to the Scherrer's formula of the following formula (I). For the X-ray, used was Cu—Kα.

$$D_x = K \cdot \lambda / (\beta \cdot \cos \theta) \quad (1)$$

In this, K is the Scherrer's constant, and is 0.94. λ is the X-ray wavelength of the Cu—Kα ray; β is the half-value width of the above-mentioned diffraction peak; and θ is the Bragg angle of the diffraction line.

<Determination of Mean Particle Diameter $D_{TEM}$>

The silver particle dispersion was observed with a transmission electronic microscope (TEM), through which independent, non-overlapping 300 silver particles were analyzed for the particle diameter thereof, and the data were averaged to compute the mean particle diameter.

[Protective Material Substitution Step]

1,4-Dihydroxy-2-naphthoic acid (special grade chemical by Wako Pure Chemical Industries, having a molecular weight of 204.18) was prepared as the organic compound B, and isopropanol (special grade chemical by Wako Pure Chemical Industries, having a molecular weight of 60.1) was as the polar solvent C.

56.8 g of 1,4-dihydroxy-2-naphthoic acid and 400 g of isopropanol were mixed and kept at a liquid temperature of 40° C. whereby 1,4-dihydroxy-2-naphthoic acid was completely dissolved in isopropanol. The above-mentioned washed solid fraction with amine A (oleylamine)-coated silver particles existing therein (containing Ag in an amount of about 1 mol (about 100 g)) was added to 456.8 g of the above liquid, and stirred at 400 rpm with a propeller. With keeping the stirring state, this was left at 40° C. for 5 hours. In this case, the amount of the organic compound B to be added to the system was so controlled that the amount of the organic compound B relative to Ag could be 0.3 equivalents.

The resulting slurry was centrifuged at 3000 rpm×5 min for solid-liquid separation. Next, this was processed according to an operation of "adding 889.7 g of methanol (about 30 equivalents relative to silver) to the solid fraction, then washing it at 400 rpm for 30 minutes, and collecting the solid fraction through centrifugation" repeated twice, thereby giving a silver micropowder sample where the protective material was substituted with 1,4-dihydroxy-2-naphthoic acid.

Figure 2:
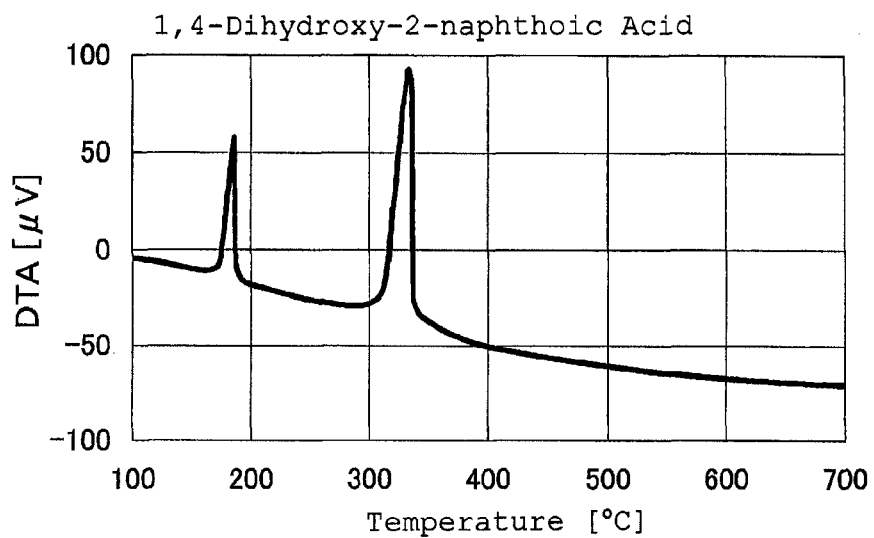
[FIG. 2] This is a DTA curve of silver particles processed to adsorb 1,4-dihydroxy-2-naphthoic acid.
Figure 4:
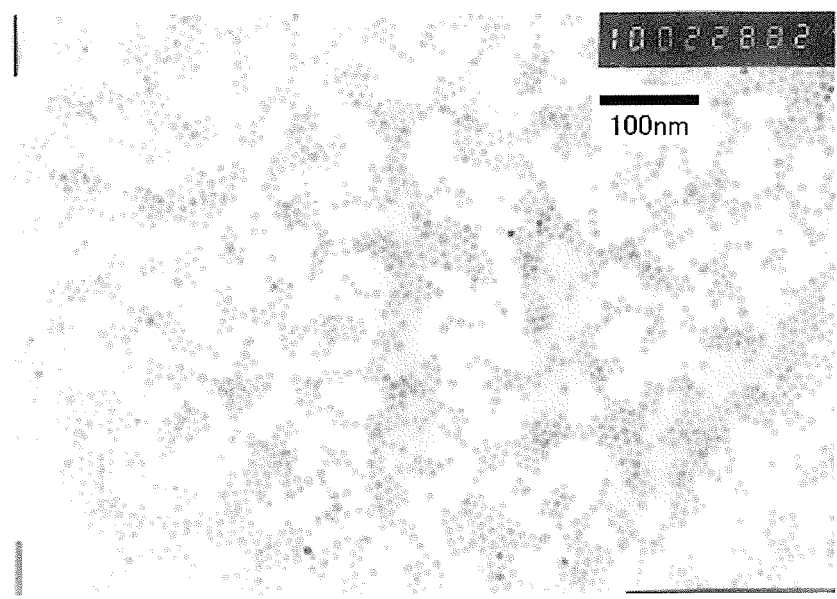
[FIG. 4] This is a TEM picture of silver particles processed to adsorb 1,4-dihydroxy-2-naphthoic acid.

The sample was analyzed through TG-DTA according to the above-mentioned method. Its DTA curve is shown in FIG. 2. By comparison between FIG. 1 (before substitution) and FIG. 2 (after substitution), it is considered that almost all the amine A (oleylamine) of the protective material was desorbed and was substituted with the organic compound B (1,4-dihydroxy-2-naphthoic acid). FIG. 4 shows a TEM picture of silver particles that have adsorbed 1,4-dihydroxy-2-naphthoic acid.

The sample was analyzed in the same manner as above to determine the X-ray crystal particle diameter $D_x$ and the mean particle diameter $D_{TEM}$ thereof, and $D_x$ was 7.57 nm and $D_{TEM}$ was 8.45 nm.

Regarding the particle diameter of each particle used in computing $D_{TEM}$, the minimum value $D_{min}$ was 6.10 nm, and the maximum value $D_{max}$ was 13.44 nm. The standard deviation of the particle diameter is represented by $\sigma_D$p, and the value of "$\sigma_D/D_{TEM}\times 100$" is called a CV value. The CV value of the silver micropowder was 14.2%. It may be said that silver particles having a smaller CV value could have a more uniform particle diameter. In application to silver ink, the CV value is preferably at most 40%; and those having a CV value of at most 15% have an extremely uniform particle diameter, and are extremely favorable for application to various microwiring.

Next, for evaluating the affinity for γ-butyrolactone, the sample was tested in a dispersibility test. 10 g of γ-butyrolactone was put into a beaker, 0.5 g of the sample was put into the beaker and lightly stirred, and then this was ultrasonicated for 10 minutes and was thereby uniformly dispersed, then kept static at room temperature for 168 hours, and thereafter the liquid was visually checked as to whether or not the liquid became cloudy or as to whether or not the liquid became precipitated or flocculated, whereby the affinity of the sample was evaluated. The evaluation standards are as follows: The case in which particles completely precipitated in 168 hours and the supernatant became transparent is confirmed poor in the affinity; and the case in which particles did not precipitate in 168 hours and the supernatant was kept cloudy is confirmed rich in the affinity. As a result, good dispersibility of the sample was confirmed. Specifically, it was confirmed that the silver nanoparticles processed to adsorb 1,4-dihydroxy-2-naphthoic acid as the protective material are readily dispersible in γ-butyrolactone and have an excellent affinity for it.

Example 2

This is the same experiment as in Example 1 except that the organic compound B was changed to gallic acid (special grade chemical by Wako Pure Chemical Industries, having a molecular weight of 170.1).

Concretely, in the protective material substitution step, 78.83 g of gallic acid and 400 g of isopropanol were mixed and kept at a liquid temperature of 40° C. whereby gallic acid was completely dissolved in isopropanol. The above-mentioned washed solid fraction with amine A (oleylamine)-coated silver particles existing therein (containing Ag in an amount of about 1 mol (about 100 g)) was added to 478.83 g of the above liquid, and stirred at 400 rpm with a propeller. With keeping the stirring state, this was left at 40° C. for 5 hours. In this case, the amount of the organic compound B to be added to the system was so controlled that the amount of the organic compound B relative to Ag could be 0.5 equivalents.

Figure 3:
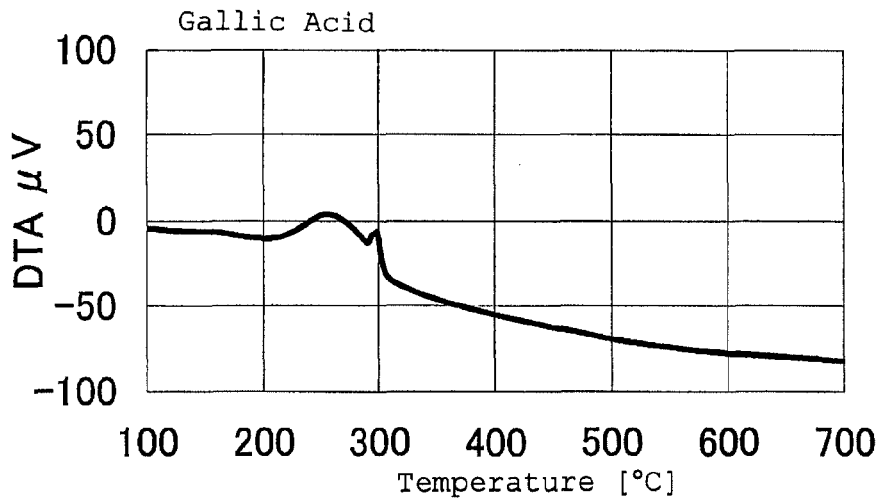
[FIG. 3] This is a DTA curve of silver particles processed to adsorb gallic acid.
Figure 5:
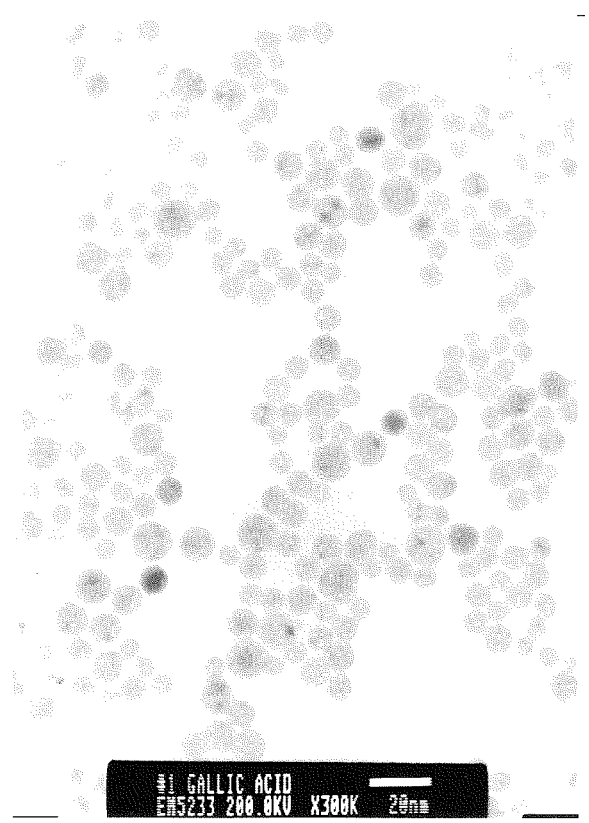
[FIG. 5] This is a TEM picture of silver particles processed to adsorb gallic acid.

The DTA curve of the obtained sample is shown in FIG. 3. By comparison between FIG. 1 (before substitution) and FIG. 3 (after substitution), it is considered that almost all the amine A (oleylamine) of the protective material was desorbed and was substituted with the organic compound B (gallic acid). FIG. 5 shows a TEM picture of silver particles that have adsorbed gallic acid.

$D_X$ of the sample was 6.58 nm and $D_{TEM}$ thereof was 8.54 nm. Regarding the particle diameter of each particle used in computing $D_{TEM}$ the minimum value $D_{min}$ was 3.99 nm, and the maximum value $D_{max}$ was 13.73 nm; and the CV value of the silver micropowder was 19.8%.

As a result of the dispersibility test in γ-butyrolactone, the sample was confirmed to have a good dispersibility. Specifically, it was confirmed that the silver nanoparticles processed to adsorb gallic acid as the protective material are readily dispersible in γ-butyrolactone and have an excellent affinity for it.

The invention claimed is:

1. A silver micropowder having affinity for at least γ-butyrolactone, which comprises silver particles processed to absorb 1,4-dihydroxy-2-naphthoic acid on the surfaces thereof and having a crystal diameter Dx of from 1 to 40 nm determined by X-ray diffraction method.

2. A silver ink obtained by dispersing silver particles processed to absorb an organic compound having a carboxyl group on the surfaces thereof and having a crystal diameter Dx of from 1 to 40 nm determined by X-ray diffraction method, in γ-butyrolactone.

3. The silver ink as claimed in claim 2, wherein the organic compound is at least one of 1,4-dihydroxy-2-naphthoic acid and gallic acid.

* * * * *